United States Patent
Fradeneck

[11] 3,813,943
[45] June 4, 1974

[54] APPARATUS FOR INSERTING AN EXPENDABLE SENSOR INTO A BASIC OXYGEN FURNACE

[75] Inventor: Ronald J. Fradeneck, Bethlehem, Pa.

[73] Assignee: Bethlehem Steel Corporation, Bethlehem, Pa.

[22] Filed: Mar. 3, 1972

[21] Appl. No.: 231,675

[52] U.S. Cl.............. 73/343 R, 73/359, 136/230, 136/234
[51] Int. Cl. ............................................. G01k 1/14
[58] Field of Search...... 73/359, 343, 354; 136/230, 136/234, 242

[56] References Cited
UNITED STATES PATENTS
| | | | |
|---|---|---|---|
| 3,327,531 | 6/1967 | Fradeneck | 73/359 |
| 3,455,164 | 7/1969 | Boyle | 73/354 |
| 3,610,601 | 10/1971 | Bishop | 73/359 |

Primary Examiner—Richard C. Queisser
Assistant Examiner—Denis E. Corr
Attorney, Agent, or Firm—Michael J. Delaney

[57] ABSTRACT

Improved apparatus for positioning a temperature sensor, such as an expendable immersion thermocouple and a liquidus arrest carbon device in a lance. The apparatus includes a sensor housing and a downwardly extending sensor lance connected to and communicating with the housing. The housing contains a rotatable sensor storage means, a variable-stroke sensor feeder means, and electrical means to power the variable stroke feeder means and limit its upper and lower movement. The electrical means is connected to external control circuitry which is responsive to the presence or absence of thermocouple wiring connections between the sensor and lance tip to automatically feed and position the sensor in the lance tip. A recorder is connected to the thermocouple and liquidus arrest carbon device in the lowermost sensor by means of sensor contacts wiping stationary contacts in the lance tip. A sensor positioned in the lance tip can be inserted into a ferrous bath in a refining furnace, such as a basic oxygen furnace, to determine the temperature and/or carbon content thereof.

3 Claims, 4 Drawing Figures

APPARATUS FOR INSERTING AN EXPENDABLE SENSOR INTO A BASIC OXYGEN FURNACE

BACKGROUND OF THE INVENTION

This invention is directed in general to improved apparatus for introducing an expendable temperature sensor into a ferrous metal bath in a basic oxygen furnace. Specifically, the invention is directed to incorporating into such apparatus electrical circuit means for controlling sensor feed and electrical contact position in a lance tip which is adapted to insert a sensor head into a ferrous bath in a basic oxygen furnace.

Modern techniques for producing steel in basic oxygen furnace require accurate and rapid determination of the temperature and/or carbon content of the ferrous bath in the furnace. Several devices, such as expendable immersion thermocouples and liquidus arrest carbon devices, have been devised to be inserted into the ferrous bath when the furnace is turned down near the end of the "blow" or refining period. An advancement in the art was the developement of a temperature sensor lance and attendant equipment as disclosed in U.S. Pat. No. 3,327,531 issued June 27, 1967 to R. J. Fradeneck and entitled "Automatic Expendable Thermocouple Lance." U.S. Pat. No. 3,327,531 describes an expendable immersion thermocouple and the apparatus by which the thermocouple can be inserted into the ferrous bath in a basic oxygen furnace while the furnace is in an upright position.

As described in the above mentioned patent, the entire length of the lance is filled with temperature sensors. When a sensor is required to be fed into the ferrous bath, a sensor is fed into the upper portion of the lance. The sensor in the bottom portion of the lance is pushed a distance beyond the end of the lance tip into the bath. It is important that the sensor be positioned accurately in the lance tip so that electrical contact is made between staple-like thermocouple contacts located on the exterior back portion of the sensor and companion wiper contacts within the lance tip. If electrical contact is not achieved, the temperature and/or the liquidus arrest carbon of the ferrous bath cannot be obtained on a remote recording device.

A sensor comprises an expendable immersion thermocouple and/or a liquidus arrest carbon device attached to one end of an elongated cardboard tube and circuited to staple-like contacts at the other end of the tube. The cardboard tube absorbs moisture from the atmosphere, causing the cardboard tube to change its length and diameter. The amount of the change in the length and diameter of the tube is dependent upon the moisture absorbed by the tube from the atmosphere. The change in the overall length of the tubes in the lance because of absorbed moisture is cumulative. As a result, the staple-like contacts on the outer surface of the lowermost tube may not be in position to make contact with the electrical contacting means in the lance tip. Thus temperature measurement and/or a liquid arrest carbon determination cannot be obtained. Then, too, the tube is manufactured to broad tolerances thereby adding to the unreliability of equal lengths and diameters. It is, therefore, difficult to position a sensor in the tip of the lance using a fixed stroke feeder means. Due to the above problems, it is necessary on many occasions to feed several sensors into the lance before electrical contact is made between the sensor and the distant recording devices. The result is a loss of sensors and an increase in production time to meet tapping corrections of the ferrous bath and an increase in production costs.

One object of this invention is to provide improved temperature measuring apparatus whereby the lowermost one of a series of temperature sensors is accurately positioned in a sensor lance to make electrical contact with the electrical contacting means in the tip of the lance to thereby obtain a temperature and/or a liquidus arrest carbon determination of the ferrous bath in the furnace.

SUMMARY OF THE INVENTION

The invention comprises combining electrical control circuit means with variable-stroke (mechanical) sensor feeder means, rotatable sensor storage means and lance electrical contacting means whereby an electrical temperature sensor can be accurately positioned in a lance tip and a temperature measurement and/or a liquidus arrest carbon determination made.

PREFERRED EMBODIMENT OF THE INVENTION

Figure 1:
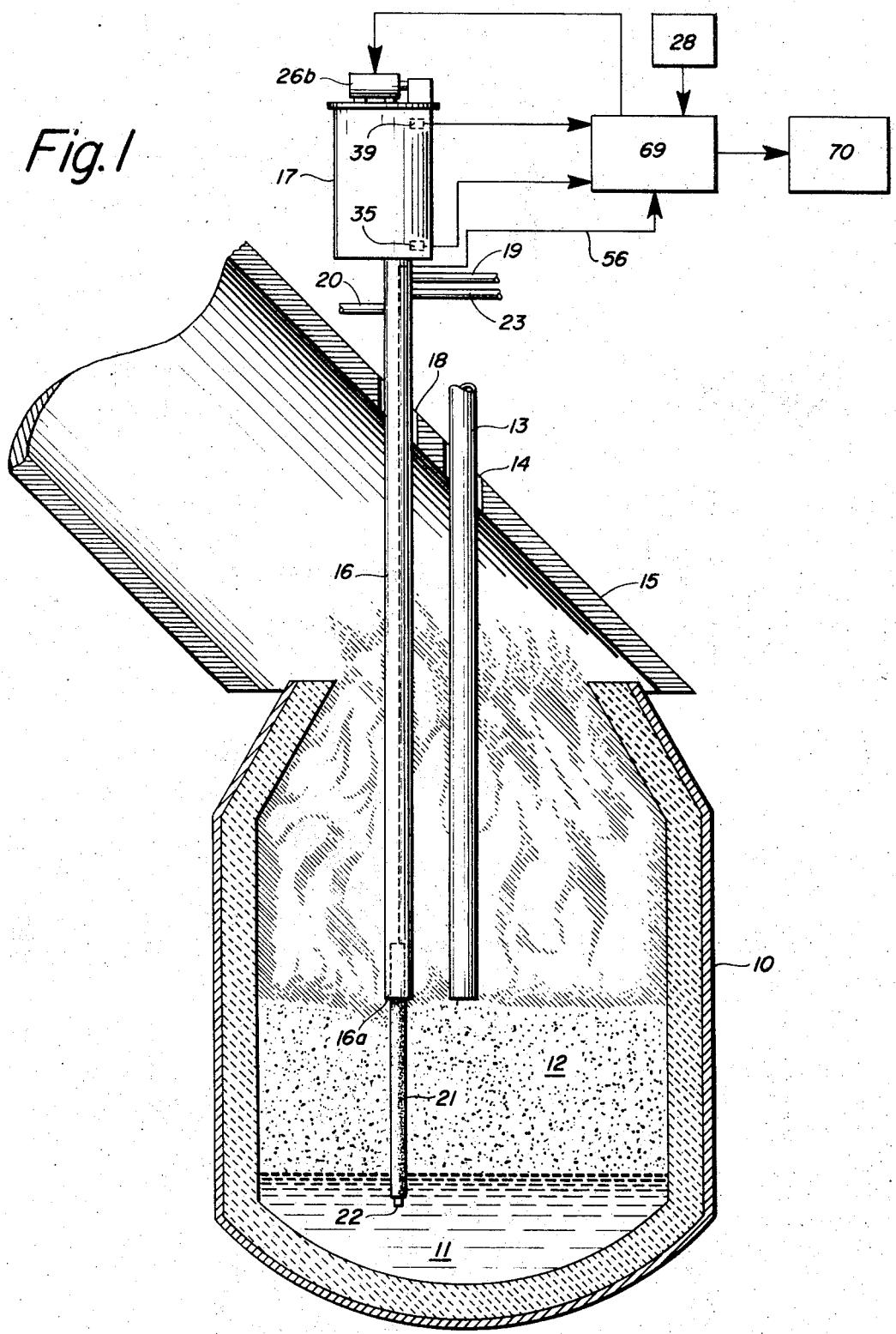
FIG. 1 is a cross-sectional view of a basic oxygen furnace, combined with a block diagram of the electrical features of the invention.

FIG. 1 shows a basic oxygen furnace 10 containing a ferrous bath 11 covered with a layer of slag 12 and an oxygen lance 13 extending downwardly through a first hole 14 in the exhaust hood 15 atop the furnace 10. A lance 16, which hereinafter will be referred to as a sensor lance 16, depends downwardly from the housing 17 containing the rotatable storage means, variable feeder means and electrical control means. Sensor lance 16 extends into the furnace 10 through a second hole 18 in the exhaust hood 15. While I have shown the sensor lance 16 up-hood from the oxygen lance 13, it will be understood that the sensor lance 16 can be positioned down-hood therefrom. The sensor lance 16 is liquid cooled. the coolant enters the sensor lance 16 through th inlet pipe 19 and flows through the lance and out of the lance through outlet pipe 20. The flow of the coolant through the lance is hereinafter described. A temperature sensor tube 21, described below, is shown extending downwardly from the open end 16a of the sensor lance 16 and through the slag layer 12 so that sensor 22 is in the ferrous bath 11 whereby a bath temperature and/or a liquidus arrest carbon can be obtained.

It is necessary to prevent ingress of slag and metal splash-back into the open end 16a of the sensor lance 16. Therefore, a gaseous medium, such as air, nitrogen, argon and the like, under pressure is introduced into the sensor lance 16 through inlet pipe 23. The gaseous medium flows downwardly through the sensor lance 16 and outwardly through the open end 16a thereof.

Temperature sensor 21 can be of the single thermocouple element type or sensor 21 can be a modified version, as the one shown in FIG. 3 and described below. The sensor 21 is not a part of this invention but is shown for illustration only. The modified version is the one referred to herein as sensor 21 and it includes two thermocouples 22a and 22b (as noted in FIG. 3) for sensing bath temperature and liquid arrest carbon, respectively, in ferrous bath 11. Thermocouple 22b is enclosed in a ceramic cup 22c (opening thereto not shown) to contain a sample of the ferrous bath. The thermocouple 22b measures temperature of the ferrous bath to determine the liquidus arrest carbon.

Figure 4:
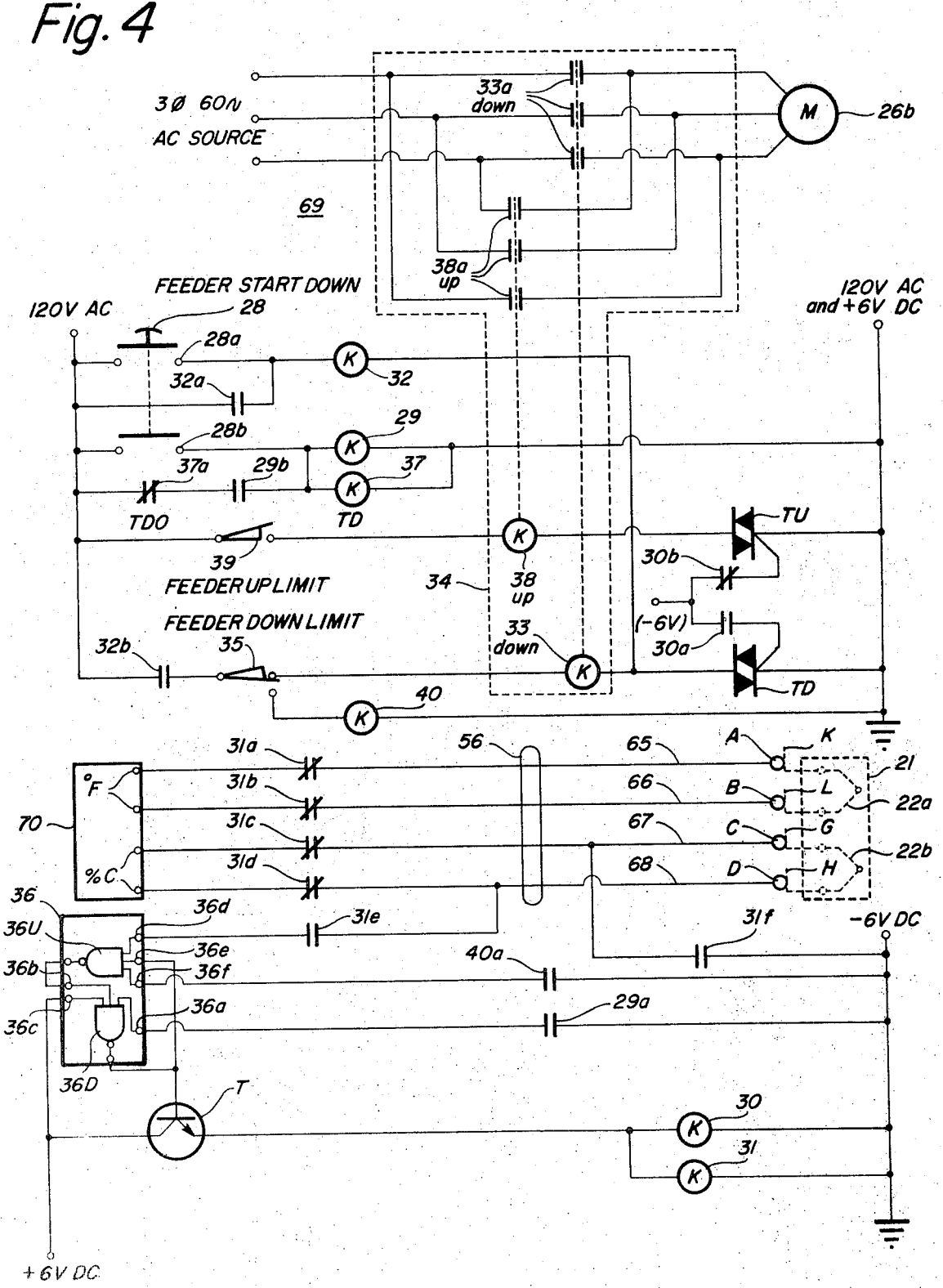
FIG. 4 is a schematic diagram of the electrical control circuit of the invention.

Also shown in FIG. 1 is a block diagram of the broad electrical features of the invention. These include controller 69 wired to sensor feeder means drive motor 26b on housing 17, to lower-and-upper-limit switches 35, 39 which limit sensor feeder extreme limits of movement, and to pushbutton 28 which is provied for manual feeder control. Controller 69, which includes control logic elements, is also wired through suitable thermocouple wires in cable 56 and wiper electrical contact means in the lower tip of sensor lance 16 to thermocouples in sensor end 22 of sensor 21 and automatically causes feed drive motor 26b to accurately position sensor 21 at the electrical contact means in sensor lance 16. When so positioned, the control logic means continuity of a given thermocouple and causes all of the thermocouple wiring connections to be switched from the control input of controller 69 to the recording inputs of external recorder 70. Additional details of the electrical features are shown in FIG. 4 schematic diagram hereinafter described.

Figure 2:
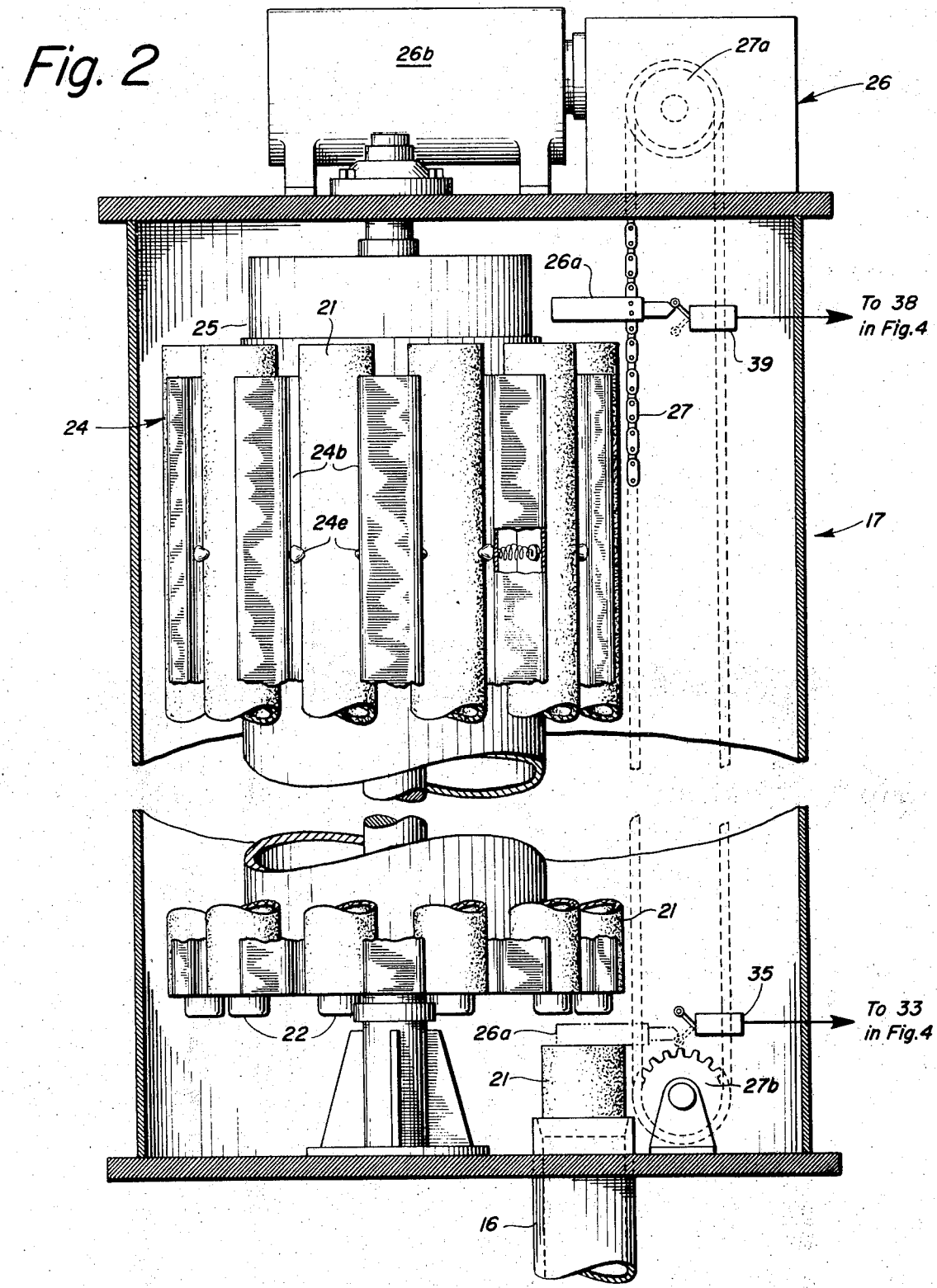
FIG. 2 is a view in elevation of the rotatable storage means and variable stroke feeder means.

As shown in FIG. 2, the sensors 21 are stored individually in a plurality of compartments shown generally at 24 in a rotatable storage means 25. The sensors are held in place in the compartments 24 by any suitable means, or example, spring-loaded buttons 24e positioned in the walls 24b of the compartments 24. A variable stroke mechanical feeder means is shown generally at 26. The mechanism comprises a feeder pusher 26a fixedly attached to an endless chain 27 which is mounted upon and is driven by sprocket 27a and passes over idler sprocket 27b, sprocket 27a being coupled to feed motor 26b which has both a brake and a clutch (not shown). Rotatable storage means 25 is indexed by a constant force which can be a weight-biased ratchet mechanism (not shown). Operation of the variable stroke mechanical feeder means 26, and indirectly storage means 25, is controlled by lower-and-upper limit switches 35, 39 and their operation contributes to the automatic sensor feed provided by an electronic circuit shown in FIG. 4.

Figure 3:
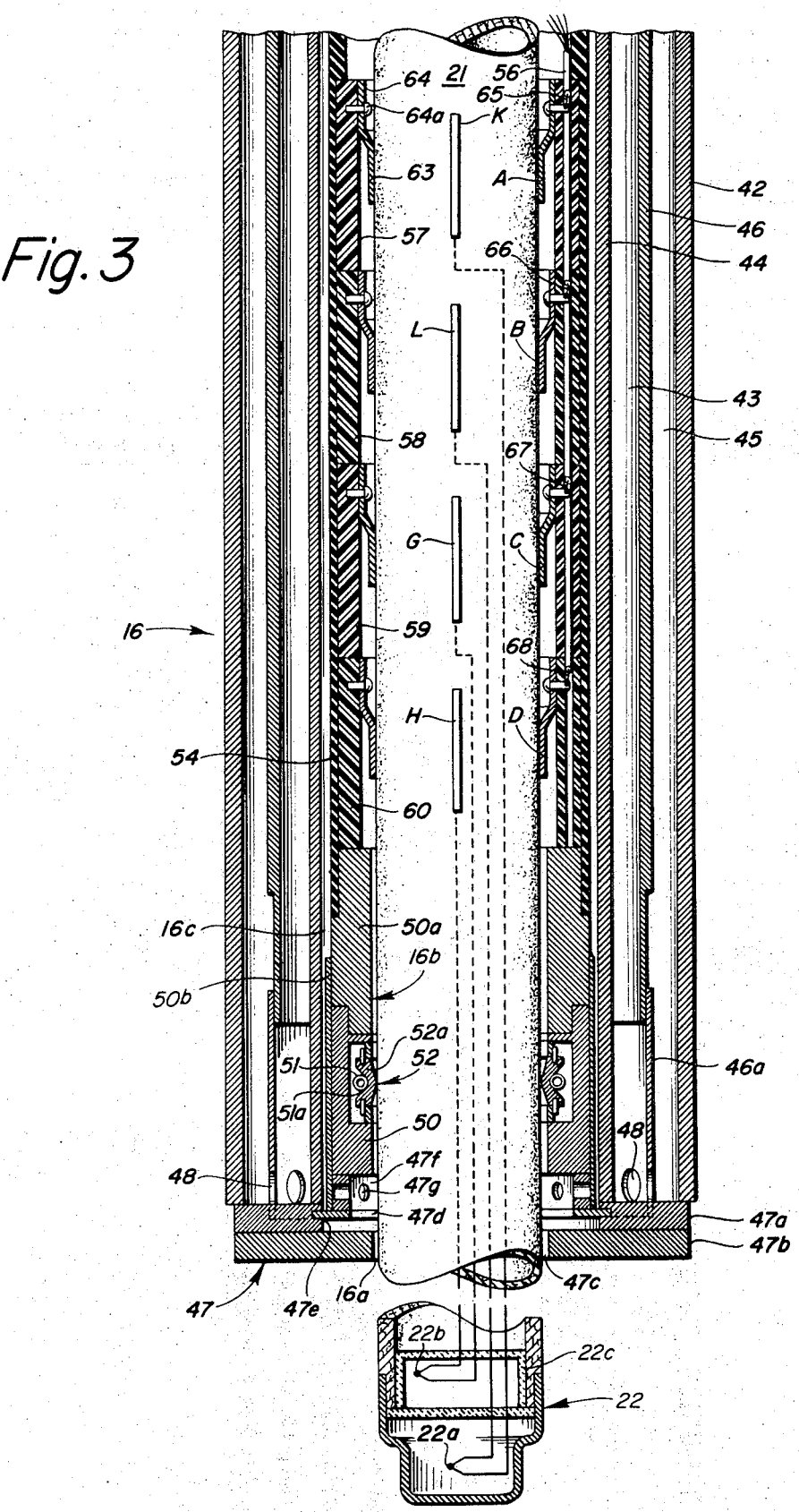
FIG. 3 is a view in elevation of the improved lance tip.

The lower portion of the sensor lance 16 is shown in FIG. 3. the sensor lance 16 comprises three concentrically aligned tubes which preferably are metallic, an outer tube 42, an intermedate tube 46 and an inner tube 44. The intermediate tube 46 is provided with a lower extension 46a. An annular space 43 is defined by the inner tube 44 and the intermediate tube 46 and a second annular space 45 is defined by the intermediate tube 46 and th outer tube 42. A fluid coolant, such as water, enters the lance at its upper portion, passes downwardly through annular space 43 through a plurality of openings 48 at the lower portion of the intermediate tube extension 46a and upwardly through annular space 45 to an outlet in the upper portion of the sensor lance 16.

The lower portion of the sensor lance 16 is closed by a removable assembly shown generally at 47. The assembly includes a plate 47a fixedly attached to the bottom of the outer tube 42. A removable plate 47b is attached to the lower surface of plate 47a. The plate 47b is provided with an annular opening 47c to allow the sensor to be pushed downwardly through the sensor lance 16. Opening 16a is formed between the plate 47b and the sensor in the lance tip. Expandable ring 47d is inserted into a groove 47e in plate 47a to act as a support for block 47f which holds the lance tip 16b in place in the lance. The block 47f is provided with a plurality of openings 47g to allow the gases in annular space 16c to pass out of the lance by way of opening 16a. The assembly 47 is removable from the bottom of the lance for maintanance or replacement of the lance tip 16b.

The lance tip shown generally at 16b contains electrical connection means, holding means and sealing means whereby the temperature and/or liquidus arrest carbon determinations can be conducted to a recording instrument and automatic operation of the feeder means is operated, the downward movement of the sensor is retarded and held in place when in position in the lance tip 16a and the ingress of slag and metal into the lance 16 is prevented.

The lance tip comprises a metallic lower portion 50 containing sealing means 52 comprising expandable ring 52a which is generally V-shaped and a tension spring 51 positioned in the groove 51a of the expandable ring 52a. The tension spring 51 keeps the expandable ring 52a closed around the bottom of the sensor 21. The closure of the sealing means 52 against the sensor 21 causes gases to exit from the lance tip 16b at the openings 16a.

Positioned atop the metallic lower portion 50 is a spacer 50a and a plurality of spacer supports 50b attached thereto. Said spacer supports 50b being placed at predetermined positions on the periphery of spacer 50a so as not to interfere with the passage of gases from annular space 16c through openings 47g, and an insulating tube 54 containing lance electrical connecting means. The lance electrical connecting means include four wiping type metallic ring connectors A, B, C and D positioned vertically in the insulating tube 54. The ring connectors A, B, C and D are insulated from each other and from the metallic lower portion 50 and upper portion of the tip (not shown) by insulating rings 57, 58, 59, and 60. Each ring connector comprises a metallic segmented ring portion 63 said solid ring portion 64 which applies a pressure sufficient to insure good contact between the segmented ring connectors A, B, c and D and staple-like sensor electrical contacts K, L, G and H on the rear portion of sensor 21. The solid ring portion 64 is attached to the insulating rings by pins 64a.

Thermocouples 22a and 22b in sensor tip 22 are wired internally with suitable thermocouple leads to staple-like sensor contacts K, L, G and H, respectively.

Lance ring connectors A, B, C and D connect thermocouples 22a and 22b in sensor 21 to controller 69 (FIG. 1) by means of cable 56 which contains suitable thermocouple extension wires 65, 66, 67, and 68 respectively, attached to pins 64a, and ultimately to remote recording device 70 (FIGS. 1 and 4).

As shown in FIG. 3, four ring connectors are used when a sensor containing two thermocouples, such as 22a for bath temperature and 22b for liquidus carbon arrest device, is to be employed in a ferrous bath to measure both of these parameters. Alternatively, a sensor containing a single thermocouple 22a or 22b for either a bath temperature or a liquidus arrest carbon device may be used to measure one such parameter. In this case, only pairs of ring connectors A and B, or C and D, are built into lower lance portion 16b. It is preferred to use ring connectors C and D wired to the electrical control circuits shown in FIG. 4 to facilitate both control and recording functions as will be described below.

The electrical control circuit is shown schematically in FIG. 4 and will be described by reference thereto as well as to associated apparatus shown in FIGS. 1–3. Initial conditions of operation include supply of sensors 21 in rotatable storage means 25, the sensor feeder pusher 26a in the full up position, a column of sensors 21 in sensor lance 16, and a completely burned-out remnant of sensor 21 used for a previous test located in lower lance portion 16b.

The electrical control circuit includes power supplies not shown and a feeder start-down momentary pushbutton 28 circuited to controller 69. Controller 69 energizes feeder motor 26b, including internal electromechanical brake and clutch devices not shown, in response to down-and-up command control signals generated as described below. Controller 69 includes a reversible motor starter 34 having down-and-up operating coils 33 and 38, respectively. These coils are energized alternately by action of feeder down-and-up limit switches 35 and 39, conventional solid state triac switching devices TD and TU which have their gate controlled as described below, and control relay 32 whose coil is energized under control of start-down momentary pushbutton contacts 28a and down triac TD. Relay contact 32a is a holding contact for relay 32 momentarily energized by contact 28a, and contact 32b controls down operating coil 33, both for the duration that down triac TD is conductive. Consequently, whenever either down-or-up operating coil 33 or 38 is energized, it actuates corresponding line contacts 33a or 38a to control the direction and duration of rotation of sensor feeder motor 26b, and therefore the extent of down and up movement of sensor pusher 26a shown in FIG. 2. As noted above, sensor pusher 26a not only pushes sensors 21 downward, but also actuates feeder down-and-up limit switches 35 and 39 at its extreme positions of movement.

Controller 69 also includes a sensor detector circuit which permits accommodating sensors of varying length by detecting the presence or absence of a sensor 21 in lower lance portion 16b (FIG. 3) under predetermined circuit conditions such as thermocouple wiring connections across lance electrical connectors. In the present embodiment, sensor 21 detection is carried out by detecting the presence or absence of thermocouple 22b circuit continuity through sensor staple-like electrical contacts G and H as sensed across lance electrical ring connectors C and D. The sensor detector circuit includes components described below which, during the presence or sensor 21, cause thermocouples 22a and 22b to be connected via sensor staple-like contacts K and L and G and H, respectively, through lance electrical ring connectors A and B and C and D, respectively, to the bath temperature and carbon determination dual recorder 70. During the absence of sensor 21, the detector circuit components disable the connections to recorder 70 and transfer lance connectors C and D into a control circuit which senses the absence or presence of circuit continuity and alternately controls the gates of aforementioned down-and-up triacs TD and TU, thereby controlling the movement of sensor feeder pusher 26a (FIG. 2), all as described more fully below.

The sensor detector circuit comprises control relays 29, 30, 31 and 40, time delay relay 37 having about a two second delay on opening normally closed contact 37a, transistor T, and conventional solid-state multiple logic device 36 which includes down-and-up logic element 36D and 36U, each logic element having three inputs 36a, 36b, 36c and 36d, 36e, 36f, respectively, and adapted to maintain one of two given states of operation. Relay 29 on timer 37 are energized by the momentary closure of feeder start-down pushbutton contact 28b and are sealed through timer contact 37a by the closure of relay contact 29b. After the two second delay of timer 37, contact 37a opens momentarily and deenergizes both relay 29 and timer 37.

During the time that relay 29 was energized, contact 29a was closed and applied a feeder start-down command signal to down logic input 36a. Under these conditions, the start-down command signal causes down-logic element 36D output signal to change to a high state and to act on transistor T to cause relays 30 and 31 to become energized and remain energized until down-logic 36D output is caused to change back to its low state.

Energizing relay 30 causes normally open contact 30a to close and normally closed contact 30b to open. The closing of relay contact 30a contacts the control gate of down triac TD to a static switching signal source (not shown), thereby rendering down trac TD conductive, and energizing relay 32 during momentary closure of feeder start-down pushbutton contact 28a, relay 32 being sealed by the closure of contact 32a. Relay contact 32b also closes and completes the circuit to feeder motor starter down coil 33, thereby energizing said coil and causing feeder motor 26b to rotate in a downward direction. This causes feeder pusher 26a (FIG. 2) to push a new sensor 21 from sensor compartment storage means 24 downward to the top of the column of sensors 21 in lance 16 and push the entire column toward sensor lance tip 16b. Feeder motor 26b and pusher 26a continue to run and cause the lowermost sensor 21 in the column to eject the remnant of the previously used sensor 21 from sensor lance tip 16b, and further cause the tip 22 of the lowermost sensor 21 to enter the molten ferrous bath 11.

During feeder downward movement, feeder upward movement is prevented by the opening of relay contacts 30b which disconnected the control gate of up triac TU from the switching signal source, thereby rendering up triac TU nonconductive and preventing up coil 38 from being energized. Feeder motor 26b and pusher 26a stop and reverse direction upon receipt of either one of two start-up command signals (described below) being applied to up-logic element 36U.

Relay 31, as noted above, was energized along with relay 30 upon the application of a down command signal to down logic element 36D. Normally closed relay contacts 31a to 31d opened and disconnected the wiring connections between lance electrical contacts A to D and dual recorder 70. At the same time, normally open relay contacts 31e and 31f closed and transferred lance electrical contacts D and C from a recording circuit to a series type continuity sensitive control circuit between ground and up-logic element input 36d, which control circuit senses the presence or absence of sensor thermocouple 22b During the absence of sensor 21 from lower lance portion 16b, the continuity-sensitive control circuit senses the absence of continuity across lance electrical contacts C and D and causes up-logic element 36U output signal to assume a high state, said output signal being applied to down-logic element input 36b as the aforesaid interlocking signal. The instant feeder pusher 26a moves the lowermost sensor 21 into electrical contact position in lower lance portion 16b, the control circuit senses the presence of thermocouple 22b continuity across lance electrical contacts C and D by way of sensor electrical contacts G and H. The sensing of continuity across contacts C and D applies a feeder first start-up command signal to up-logic input 36d while the output signal from down-logic element 36D is applied also as an interlocking signal to up-logic input 36e and while input 36f remains in a high state, the latter being adapted to receive a feeder second start-up command signal described below.

Under the foregoing conditions, the first start-up command signal causes up-logic element 36U output signal to change to a high state and to act on down-logic input 36b to return it to its original low state, thus causing transistor T to deenergize relays 30 and 31. Relay contacts 30a open and 30b close, thus rendering down triac TD nonconductive and up triac TU conductive, which action deenergizes down coil 33 and relay 32 and energizes up coil 38. Consequently, sensor feeder motor 26b excitation is reversed and feeder pusher 26a stops moving sensor 21 downward and is automatically reversed to upward movement. Feeder pusher 26a continues upward movement until it strikes feeder up-limit switch 39, at which time it deenergizes up coil 38 and feeder motor 26b. At this point, rotatable storage means 25 automatically indexes to position a new sensor 21 over the top opening of sensor lance 16. Feeder pusher 26a stays in the up position until recycling in initiated by a feeder start-down command signal, such as when use of a new sensor 21 becomes necessary.

When relay 31 was deenergized by the first start-up command signal, relay contacts 31e and 31f opened and disconnected the continuity-sensitive control circuit from lance electrical contacts C and D. Simultaneously, relay contacts 31a to 31d closed and transferred the wiring connections at lance electrical contacts A to D to the input of dual recorder 70 where the bath temperature and carbon determination signals generated by thermocouples 22a and 22b while in ferrous bath 11 may be recorded until the thermocouples burn out.

Returning now to the condition where a sensor 21 is being pushed downward toward the lower lance portion 6b, the sensor may be of such length that the continuity-sensitive control circuit including lance electrical contacts C and D may never sense the continuity of thermocouple 22b. Also, the possibility exists where a sensor 21 when positioned at contacts C and D may have a broken or an open-circuited thermocouple 22b and, therefore, not be detected as being in lower lance portion 16b. In these cases, the continuity-sensitive control circuit will be inoperative and feeder pusher 26a will continue downward until it strikes feeder down limit switch 35. At this time, the limit switch 35 normally closed contact opens and deenergizes down coil 33 and stops feeder motor 26b. Limit switch 35 normally open contact also closes and energizes relay 40. Relay contact 40a closes (and remains closed until limit switch 35 opens) and applies a feeder second start-up command signal to up-logic input 36f. This has the same effect on up-logic element 36U as does the feeder first start-up command signal. That is, it stops feeder pusher 26a downward movement and automatically reverses the feeder pusher to upward movement, all as described above.

Returning now to the condition where sensor tip 22 is measuring bath temperature and carbon determination, in the event of a short-circuit produced across sensor staple-like contacts G and H by the burn-out of remnant of thermocouple 22b, from a previous test, then when the next feeder start-down command is given, the continuity-sensitive circuit across lance electrical ring connectors C and D would sense continuity across connectors C and D and produce a first up-command signal. However, in the sensor detect circuit involving relay 29 and timer 37, the first start up command signal, caused by the short-circuited burned out sensor remnant, is overridden for two seconds by the start-down command signal applied to down-logic input 36a by the closure of relay contact 29a. This allows feeder pusher 26a sufficient time to push the short-circuited remnant out of the lance at tip portion 16b and return to normal operations as described above.

The downward travel of the variable stroke feeder means 26 is terminated when the sensor staple-like contacts G and H on the outer surface of tubular sensor 21 makes contact with the lance ring connectors C and D in the lance tip 16b. Therefore, it is of no consequence that sensor cardboard tube length changes due to moisture in the atmosphere because the position of the sensor in lance tip 16b is determined by the action of the electric sensor detector circuit and not by the length of the stroke of the variable feeder means 26 or the length of the cardboard tube to which the sensor tip 22 is attached.

I claim:

1. In temperature measuring apparatus where variable length, expendable, electrical temperature sensors are fed sequentially from sensor storage means by variable feed stroke feeder means through a sensor lance which is inserted into a furnace, said sensor lance having lance electrical ring connectors incorporated at a tip position and adapted to cooperate with sensor electrical staple-like contacts on each sensor, the improvement comprising:

electrical control means including a sensor detector circuit having logic means adapted to respond to the absence of continuity of said temperature sensor to automatically maintain downward sensor feed, and further adapted to respond to the presence of continuity of said sensor when connections are made through said sensor staple-like contacts and lance electrical ring connectors to automatically stop sensor feed and reverse said sensor feeder means.

2. In temperature measuring apparatus where expendable electrical temperature sensors are fed sequentially from sensor storage means by feeder means through a sensor lance which is inserted into a furnace, such as a basic oxygen furnace, said sensor lance having lance electrical ring connectors incorporated at a tip position and adapted to cooperate with sensor electrical staple-like contacts on each sensor, the improvement comprising:

electrical control means circuited to said feeder means and said lance electrical ring connectors for controlling sensor feeder means to position a sensor so as to connect said sensor staple-like contacts and lance electrical ring connectors in response to a predetermined circuit condition of said termperature sensor, said electrical control means including logic means adapted to respond to said predetermined circuit condition for transferring temperature sensor connections from internal control circuitry to external recording circuitry.

3. Apparatus for measuring one or more temperatures in a ferrous bath in a furnace such as a basic oxygen furnace, comprising:

a. a plurality of variable-length expendable electrical temperature sensors, each including a tubular body, one or more temperature sensitive elements at one end, and sensor electrical staple-like contacts at an opposite end wired to said temperature sensitive elements, b. means for feeding said variable-length sensors sequentially from sensor storage means and variable-stroke feeder means through a sensor lance and into said ferrous bath, said sensor lance having lance electrical ring connectors incorporated at a tip position and adapted to cooperate with the electrical staple-like contacts on each sensor, c. electrical control means for automatically controlling sensor feeder means to accurately position said sensor staple-like contacts with said lance electrical ring connectors regardless of sensor length, said electrical control means including a sensor detector circuit having logic means adapted to respond to the absence of continuity of said temperature sensor to automatically maintain downward sensor feed, and further adapted to respond to the presence of continuity of said sensor when connections are made through said staple-like contacts and lance electrical ring connectors to automatically stop sensor movement and reverse said sensor feeder means, and d. utilization means connected to said electrical control means and responsive to electrical temperature sensor signals transmitted thereto for determining one or more temperature properties of said ferrous bath.

* * * * *